(12) United States Patent
Brost et al.

(10) Patent No.: US 6,970,766 B2
(45) Date of Patent: Nov. 29, 2005

(54) METHOD FOR MACHINE TOOL AND PROFILOMETER COORDINATE REGISTRATION

(75) Inventors: Randolph C. Brost, Albuquerque, NM (US); David R. Strip, Albuquerque, NM (US); Randall H. Wilson, Albuquerque, NM (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/830,649

(22) Filed: Apr. 23, 2004

(65) Prior Publication Data

US 2005/0240302 A1 Oct. 27, 2005

(51) Int. Cl.[7] .............................................. G06F 19/00
(52) U.S. Cl. ..................................... 700/195; 700/193
(58) Field of Search ................................ 700/159, 193, 700/195

(56) References Cited

U.S. PATENT DOCUMENTS

| | | | |
|---|---|---|---|
| 4,503,617 A | 3/1985 | Chevier et al. | |
| 4,583,159 A | * 4/1986 | Kanemoto et al. | ........... 700/195 |
| 5,257,460 A | 11/1993 | McMurtry | |
| 5,270,942 A | * 12/1993 | Reed | ........................... 700/195 |
| 5,274,566 A | * 12/1993 | Reed et al. | .................. 700/195 |
| 5,313,410 A | 5/1994 | Watts | |
| 5,335,183 A | 8/1994 | Tsuboi et al. | |
| 5,955,661 A | 9/1999 | Samsavar et al. | |
| 6,062,948 A | 5/2000 | Schiff et al. | |
| 6,163,973 A | 12/2000 | Matsumiya et al. | |
| 6,327,788 B1 | 12/2001 | Seddon et al. | |
| 6,401,149 B1 | 6/2002 | Dennin et al. | |
| 6,427,353 B1 | 8/2002 | Nelson et al. | |
| 2002/0062572 A1 | 5/2002 | Bindell et al. | |

FOREIGN PATENT DOCUMENTS

| | | |
|---|---|---|
| DE | 40 38 849 A1 | 6/1992 |
| EP | 0 257 164 | 3/1988 |
| FR | 2 599 654 | 12/1987 |
| JP | 4 105 010 A | 4/1992 |
| WO | 98/30866 | 7/1988 |

* cited by examiner

*Primary Examiner*—Leo Picard
*Assistant Examiner*—R Jarrett
(74) *Attorney, Agent, or Firm*—Clyde E. Bailey, Sr.

(57) ABSTRACT

A method for registering machine tool and profilometer coordinates, wherein the machine tool defines a C-axis having a zero position, C=0, comprises loading a sacrificial workpiece into the machine tool; cutting several first features in a surface of the sacrificial workpiece and producing a linear machine tool motion across the workpiece; determining the centroid of each first cut feature; fitting a line to the centroids of the first cut features; and measuring angle $\theta_0$ of the line relative to the C-axis zero position. The angle $\theta_0$ is the departure in profilometer coordinates from the C=0 line. The method includes moving the machine tool to a fixed radius; cutting several second features in a surface of the sacrificial workpiece and producing a circular machine tool motion across the workpiece; determining the centroid of each second cut feature; fitting a circle to the centroids of the second cut features; and determining a center of the circle. The center of the circle is the machine tool center in profilometer coordinates.

3 Claims, 2 Drawing Sheets

METHOD FOR MACHINE TOOL AND PROFILOMETER COORDINATE REGISTRATION

FIELD OF THE INVENTION

The invention relates generally to profilometer measurements, and more particularly to a method for machine tool and profilometer coordinate registration.

BACKGROUND OF THE INVENTION

When machining precise surfaces of a workpiece, it is often necessary to measure them using a precise measuring instrument, such as a scanning profilometer. In these situations, it is necessary to register the measurements of the profilometer with the motion coordinates of the machine tool. A fixture is used to hold the workpiece while allowing the workpiece to be removed and replaced in the machine tool and profilometer in a repeatable fashion. For example, mounting the workpiece in the fixture allows it to be installed in the machine tool, removed and re-installed, and the position of the workpiece relative to the machine tool coordinate system will be identical to the original position.

Consider a turning machine, for example, which has a controllable spindle orientation and controllable tool motion axes, such that it is possible to control the machine to move the tool to a specific location on the workpiece. Directing the machine to address a specific measured point on the workpiece is problematic because it is necessary to identify both the relative position and orientation of the measurement data with respect to the machine tool coordinate system. Accordingly, it will be appreciated that it would be highly desirable to have a method for machine tool and profilometer registration so that measured surface data can be registered with commanded machining actions in all three degrees of freedom required to define surface points.

European patent document EP 02 57 164 A1 discloses a device for relative positioning between a tool and a workpiece, and German patent document DE 40 38 849 A1 discloses an electronic measurement head. Both make use of electric current in the positioning device. Electric currents can be erratic due to resistance changes in the electric current path, such as can occur between different workpieces or the same workpiece at different times.

Thus, there remains a need for a method for machine tool and profilometer registration that allows accurate measurement of different workpieces or the same workpiece at different times.

SUMMARY OF THE INVENTION

The present invention is directed to overcoming one or more of the problems set forth above. Briefly summarized, according to one aspect of the invention, a method for registering machine tool and profilometer coordinates, wherein the machine tool defines a C-axis having a zero position, C=0, comprises loading a sacrificial workpiece into the machine tool; cutting several first features in a surface of the sacrificial workpiece and producing a linear machine tool motion across the workpiece; determining the centroid of each first cut feature; fitting a line to the centroids of the first cut features; and measuring angle $\theta_0$ of the line relative to the C-axis zero position. The angle $\theta_0$ is the departure in profilometer coordinates from the C=0 line. The method includes moving the machine tool to a fixed radius; cutting several second features in a surface of the sacrificial workpiece and producing a circular machine tool motion across the workpiece; determining the centroid of each second cut feature; fitting a circle to the centroids of the second cut features; and determining a center of the circle. The center of the circle is the machine tool center in profilometer coordinates.

The method provides a means for registering measured surface data with commanded machining actions in all three degrees of freedom required to define surface points. An advantage of the method is that it may be used even when the shape of the machined cut volume is complex or even impossible to predict. This is often the case for polishing processes and other processes that use flexible tools. The method is not sensitive to cut volume errors that may result from cutter deflection, etc., as long as the cut process is consistent, even when rigid tools are used.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
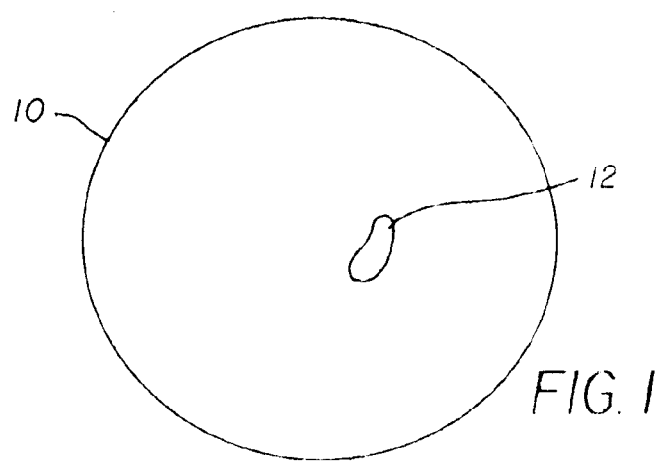
FIG. 1 is diagram of a work-piece with an irregularly shaped polishing area.

Referring to FIG. 1, an example of a process for a machine tool that executes a material removal process that is difficult to characterize is polishing with a spinning compliant tool. The material removed depends on the shape of the contact area between the tool and the work-piece 10, the pressure distribution across this contact area, and dynamic effects such as fluid flow and fluid layer thickness. Because of these variables, it is difficult to predict the material removal area and volume.

If the polishing tool is held in a fixed position for some period of time, the resulting polished area 12 has an irregular shape. The way current machines are used is to measure the current surface of an optic, plan a polishing action to correct errors, and then execute the polishing plan on the machine. This requires correlating the coordinate system of the measurement machine with the coordinate system of the polishing machine.

Figure 2:
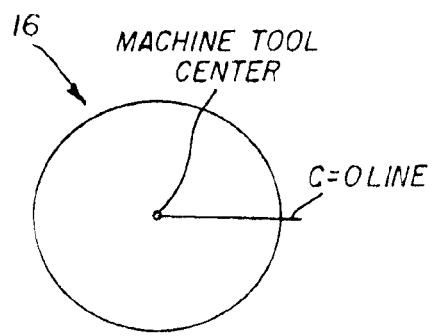
FIG. 2 is diagram of a work-piece illustrating the machine tool center and C-axis at its zero position where C=0.
Figure 3:
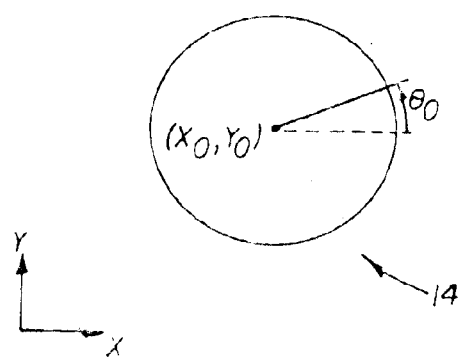
FIG. 3 is diagram of the work-piece of FIG. 2. illustrating the C=0 line in profilometer coordinates where the C=0 is offset from horizontal by an angle $\theta_0$ and where the machine tool center has coordinates $x_0$, $y_0$.

Referring to FIGS. 2 and 3, a profilometer 14 is one type of measuring machine. A machine tool 16 has a spindle like a lathe referred to as the machine C-axis. The parameters that must be identified are $x_0$, $y_0$, and $\theta_0$. The machine tool center is the point on the optic surface where the C-axis intersects the surface when the optic is loaded on the machine. The point, $(x_0, y_0,)$ is the position of the machine tool center in profilometer coordinates, when the optic is loaded on the profilometer. When the point, $(x_0,) y_0$, is known, the measured profilometer data can be shifted and expressed in terms of machine tool coordinates. This allows planning and controlling the polishing process.

The orientation, $\theta_0$, is also needed to control polishing. To understand $\theta_0$, the C=0 line must first be defined. The C=0 line is a specific reference direction on the optic surface when it is loaded on the machine tool. For example, if the machine tool C-axis is driven to its zero position and an imaginary horizontal line is drawn on the optical surface, then that is the C=0 line. The parameter, $\theta_0$, measures the angle of this line in the profilometer coordinate system when the optic is loaded on the profilometer.

Figure 4:
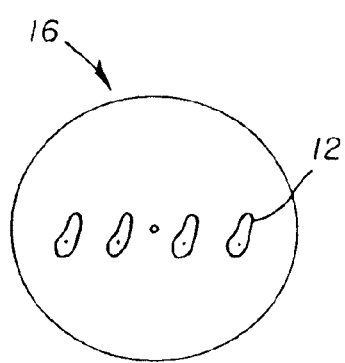
FIG. 4 is diagram of a work-piece with several irregularly shaped polishing areas arranged in a line.
Figure 5:
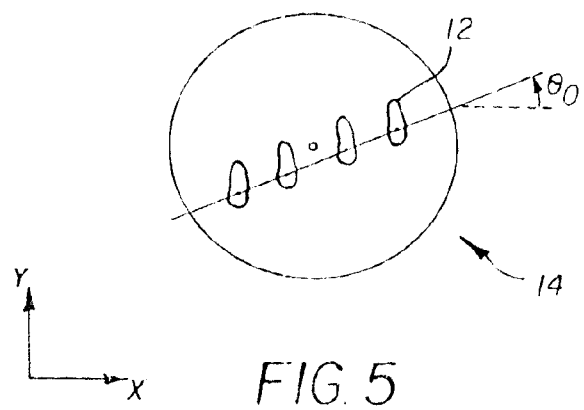
FIG. 5 is diagram of the work-piece of FIG. 4 in profilometer coordinates illustrating angle $\theta_0$.

The purpose of the method of the invention is to measure $x_0$, $y_0$, and $\theta_0$, given a machine tool with a complex material removal process such as polishing. To measure parameter $\theta_0$, several spots are polished in a line while holding the C-axis fixed (FIG. 4). The spots are measured individually with the profilometer and the centroids of the resulting removal volumes are computed. A line is fit to the centroids and the angle, $\theta_0$, of the line is measured (FIG. 5). This method works even if the spot centroids do not pass through the machine tool center. Accurate results are produced, even for bizarre general spot shapes, as long as the spots are produced consistently.

Figure 6:
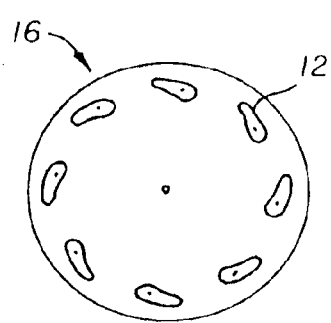
FIG. 6 is diagram of a work-piece with several irregularly shaped polishing areas arranged in a circle.
Figure 7:
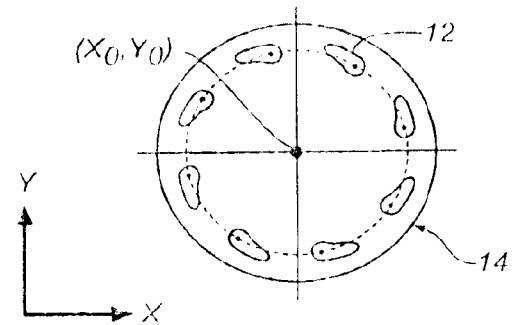
FIG. 7 is diagram of the work-piece of FIG. 6 in profilometer coordinates illustrating coordinates $x_0$, $y_0$ which is the machine tool center.

Referring to FIGS. 6 and 7, to measure the machine tool center, ($x_0$, $y_0$,) the machine tool is moved to a fixed radius and several spots are polished at different C-axis positions. Compute the spot centroids as before and fit a circle to the resulting set of points. If the spots are consistent, the correct center will be identified, no matter how strange the spot shape may be. This method allows 3-d profilometer data and polishing machines to work together, even though the material removal patch of the polishing machine is irregular and difficult to model.

It can now be appreciated that a method for registering machine and profilometer coordinates uses the relative angle between coordinate systems. To identify the relative angle between the coordinate systems, a sacrificial workpiece is loaded into the machine tool, and several machining marks are made while holding the spindle orientation fixed at a constant known angle and varying the other machine axes to produce a linear tool motion across the workpiece. This procedure can be repeated for various spindle orientations if desired. The workpiece is then taken to the profilometer, and the machined features are measured. Computer analysis is used to identify the centroid of each machined feature's cut volume. Consistent machining produces centroids that lie on a line, and the angle of this line will identify the angular relationship between the machine and profilometer coordinate systems.

To identify the spindle center in the profilometer coordinate system, the tool is held in constant radius position and several features are machined in a sacrificial workpiece at different spindle orientations. The workpiece is then taken to the profilometer and the features measured. The centroids of the measured cut volumes will form a circle. When a circle is numerically fitted to the centroids, the center of the resulting fitted circle is the spindle center in the profilometer coordinate system.

The method of the present invention provides a means for registering measured surface data with commanded machining actions in all three degrees of freedom required to define surface points. An advantage of the method is that it may be used even when the shape of the machined cut volume is complex or even impossible to predict. This is often the case for polishing processes and other processes that do not use rigid tools. Even if rigid tools are used, this method has the advantage that it is not sensitive to cut volume errors that may result from cutter deflection, etc., as long as the cut process is consistent.

The invention has been described with reference to a preferred embodiment; however, it will be appreciated that variations and modifications can be effected by a person of ordinary skill in the art without departing from the scope of the invention. For example, while the method is particularly targeted to turning machines tools with controllable spindles, it could be used with Cartesian machine tools as well.

The invention has been described in detail with particular reference to certain preferred embodiments thereof, but it will be understood that variations and modifications can be effected within the spirit and scope of the invention.

PARTS LIST

10 work-piece
12 polished area
14 profilometer
16 machine tool

What is claimed is:

1. A method for registering machine tool and profilometer coordinates, said machine tool defining a C-axis having a zero position, said method comprising the steps of:

loading a sacrificial workpiece into the machine tool;

cutting several first features in a surface of the sacrificial workpiece and producing a linear machine tool motion across the workpiece;

determining the centroid of each first cut feature;

fitting a line to said centroids of said first cut features;

measuring angle $\theta_0$ of said line relative to the C-axis zero position;

moving the machine tool to a fixed radius;

cutting several second features in a surface of the sacrificial workpiece and producing a circular machine tool motion across the workpiece;

determining the centroid of each second cut feature;

fitting a circle to said centroids of said second cut features; and determining a center of the circle, said center being the machine tool center in profilometer coordinates.

2. A method for registering machine tool and profilometer coordinates, said machine tool defining a C-axis having a zero position, said method comprising the steps of:

loading a sacrificial workpiece into the machine tool;

cutting several first features in a surface of the sacrificial workpiece and producing a linear machine tool motion across the workpiece;

determining the centroid of each first cut feature;

fitting a line to said centroids of said first cut features; and measuring angle $\theta_0$ of said line relative to the C-axis zero position.

3. A method for registering machine tool and profilometer coordinates, said machine tool defining a C-axis having a zero position, said method comprising the steps of:

loading a sacrificial workpiece into the machine tool;

moving the machine tool to a fixed radius;

cutting several second features in a surface of the sacrificial workpiece and producing a circular machine tool motion across the workpiece;

determining the centroid of each second cut feature;

fitting a circle to said centroids of said second cut features; and determining a center of the circle, said center being the machine tool center in profilometer coordinates.

* * * * *